United States Patent
Buvid et al.

(10) Patent No.: US 11,498,307 B2
(45) Date of Patent: Nov. 15, 2022

(54) SHAPE MEMORY MATERIALS WITH REVERSIBLE TRANSITIONS

(71) Applicant: International Business Machines Corporation, Armonk, NY (US)

(72) Inventors: Daniel J. Buvid, Rochester, MN (US); Eric J. Campbell, Rochester, MN (US); Tyler Jandt, Rochester, MN (US); Joseph Kuczynski, North Port, FL (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 15/075,150

(22) Filed: Mar. 19, 2016

(65) Prior Publication Data

US 2017/0266910 A1   Sep. 21, 2017

(51) Int. Cl.
   *B32B 3/16*   (2006.01)
   *B32B 37/14*   (2006.01)
   (Continued)

(52) U.S. Cl.
   CPC ........... *B32B 3/16* (2013.01); *B32B 7/12* (2013.01); *B32B 15/082* (2013.01); *B32B 15/09* (2013.01);
   (Continued)

(58) Field of Classification Search
   CPC .. B32B 3/16; B32B 7/12; B32B 15/08; B32B 15/20; B32B 37/144; F16B 1/0014
   See application file for complete search history.

(56) References Cited

U.S. PATENT DOCUMENTS 5,531,664 A   7/1996   Adachi et al.
5,679,216 A   10/1997   Takayama et al.
(Continued)

FOREIGN PATENT DOCUMENTS

CN   103265786 A   8/2013
JP   61197770 A   9/1986

OTHER PUBLICATIONS

Coxworth, Ben; "New tech allows 'memory materials' to store multiple memorized shapes"; Gizmag; <http://www.gizmag.com/memory-materials-take-on-multiple-shapes/16232/>; Sep. 2, 2010.
(Continued)

*Primary Examiner* — Laura A Auer
(74) *Attorney, Agent, or Firm* — Grant Johnson

(57) ABSTRACT

Disclosed aspects relate to a structure which includes shape memory materials having transition triggers to transition the shape memory materials between initial states and transitioned states. A first physical shape of the structure exists when the first shape memory material has the first initial state and the second shape memory material has the second initial state. A second physical shape of the structure exists when the first shape memory material has the first transitioned state and the second shape memory material has the second initial state. A third physical shape of the structure exists when the first shape memory material has the first transitioned state and the second shape memory material has the second transitioned state. The physical shapes of the structure are reversible in nature. In embodiments, the shape memory materials are bonded to a flexible substrate or are clad together.

13 Claims, 10 Drawing Sheets

(51) Int. Cl.
| | |
|---|---|
| *F16B 1/00* | (2006.01) |
| *B32B 15/18* | (2006.01) |
| *B32B 27/30* | (2006.01) |
| *B32B 27/28* | (2006.01) |
| *B32B 27/08* | (2006.01) |
| *B32B 27/34* | (2006.01) |
| *B32B 7/12* | (2006.01) |
| *B32B 27/32* | (2006.01) |
| *B32B 27/36* | (2006.01) |
| *B32B 15/20* | (2006.01) |
| *B32B 15/09* | (2006.01) |
| *B32B 15/095* | (2006.01) |
| *B32B 15/082* | (2006.01) |
| *B32B 27/12* | (2006.01) |
| *B32B 27/40* | (2006.01) |
| *B32B 37/12* | (2006.01) |
| *F16B 11/00* | (2006.01) |

(52) U.S. Cl.
CPC ............ *B32B 15/095* (2013.01); *B32B 15/18* (2013.01); *B32B 15/20* (2013.01); *B32B 27/08* (2013.01); *B32B 27/12* (2013.01); *B32B 27/281* (2013.01); *B32B 27/304* (2013.01); *B32B 27/32* (2013.01); *B32B 27/34* (2013.01); *B32B 27/36* (2013.01); *B32B 27/40* (2013.01); *B32B 37/144* (2013.01); *F16B 1/0014* (2013.01); *B32B 37/12* (2013.01); *B32B 2250/02* (2013.01); *B32B 2250/03* (2013.01); *B32B 2250/44* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2270/00* (2013.01); *B32B 2274/00* (2013.01); *B32B 2307/20* (2013.01); *B32B 2307/30* (2013.01); *B32B 2307/50* (2013.01); *B32B 2311/005* (2013.01); *B32B 2398/20* (2013.01); *B32B 2457/00* (2013.01); *B32B 2535/00* (2013.01); *B32B 2605/00* (2013.01); *F16B 11/006* (2013.01)

(56) References Cited

U.S. PATENT DOCUMENTS

| | | |
|---|---|---|
| 5,772,105 A | 6/1998 | Zadno-Azizi et al. |
| 6,764,441 B2 | 7/2004 | Chiel et al. |
| 7,665,300 B2 | 2/2010 | Biggs et al. |
| 8,361,368 B2 | 1/2013 | Xie et al. |
| 2003/0064228 A1* | 4/2003 | Oosedo ............... C08G 59/18 428/413 |
| 2006/0125291 A1* | 6/2006 | Buravalla ............ B62D 21/15 296/204 |
| 2009/0309258 A1 | 12/2009 | Lendlein |
| 2010/0028686 A1* | 2/2010 | Xie ................. B29C 61/0616 428/413 |
| 2010/0187361 A1* | 7/2010 | Rawlings ............... B32B 3/08 244/130 |
| 2012/0277400 A1* | 11/2012 | Chen ................ C08G 63/6854 528/288 |
| 2013/0006238 A1 | 1/2013 | Ditter et al. |
| 2013/0298548 A1 | 11/2013 | Chen et al. |
| 2015/0093559 A1 | 4/2015 | Baer et al. |
| 2015/0232973 A1 | 8/2015 | Browne et al. |

OTHER PUBLICATIONS

Shin, James; "Shape Memory Elastomers and Fatty Acid Organogels: Functional Materials From Small Molecule Additives"; A Thesis Presented to The Graduate Faculty of The University of Akron; <https://etd.ohiolink.edu/!etd.send_file?accession=akron1383340291&disposition=inline>; Dec. 2013.

Meng et al.; "Shape Actuation via Internal Stress-Induced Crystallization of Dual-Cure Networks"; ACS Macro Lett., 2015, 4 (1), pp. 115-118; Jan. 10, 2015.

Lendlein et al.; "Shape-Memory Polymers"; Angew. Chem. Int. Ed. 2002, 41, 2034-2057.

Huang et al.; "Shape Memory Polymers (SMPs)—Current Research and Future Applications"; <http://www.azom.com/article.aspx?ArticleID=6038>; May 24, 2012.

* cited by examiner

SHAPE MEMORY MATERIALS WITH REVERSIBLE TRANSITIONS

BACKGROUND

This disclosure relates generally to shape memory materials and, more particularly, relates to reversible shape changes. Shape memory materials are stimuli responsive materials. Shape memory functionality is the ability of a material to transition from a first shape to a second shape after application of an external stimulus. The phenomenon can be considered a functionality as opposed to an inherent material property. The functionality results from a combination of material structure and particular processes.

SUMMARY

Aspects of the disclosure relate to a structure which includes shape memory materials having transition triggers to transition the shape memory materials between initial states and transitioned states. A first physical shape of the structure exists when the first shape memory material has the first initial state and the second shape memory material has the second initial state. A second physical shape of the structure exists when the first shape memory material has the first transitioned state and the second shape memory material has the second initial state. A third physical shape of the structure exists when the first shape memory material has the first transitioned state and the second shape memory material has the second transitioned state. The physical shapes of the structure are reversible in nature.

Aspects of the disclosure include two-way shape memory materials with multiple shape memory transitions using a bonding technique or a cladding technique. Aspects combine multiple, reversible, two-way shape memory materials to form a composite structure that can undergo various shape memory reactions. The shape memory materials can include reversible polymers, elastomers, or metals. The composites can be constructed by layering, co-injection molding, joining material edges, welding, etc. Additionally, the composite can be constructed by utilizing shape memory material fibers and incorporating them into a base matrix such as epoxy resin. The shape memory materials may be clad together or bonded to a flexible substrate.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
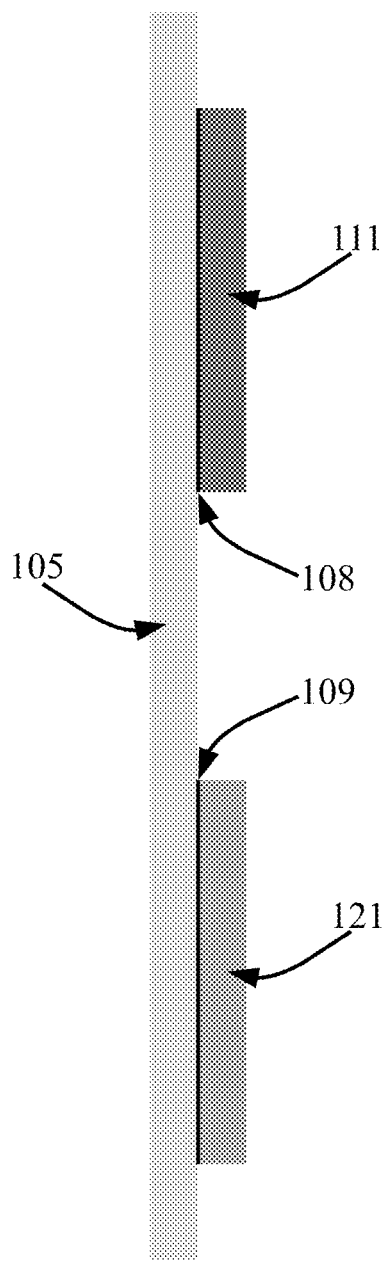
FIG. 1 illustrates a side viewpoint of a first physical shape of a structure having a bond to a flexible substrate, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include two-way shape memory materials with multiple shape memory transitions using a bonding technique or a cladding technique. Aspects combine multiple, reversible, two-way shape memory materials to form (e.g., via a method of manufacture) a composite structure that can undergo various shape memory reactions. In general, shape memory materials simply undergo two transitions, starting from a deformed state and transitioning to a relaxed state. Certain shape memory materials may undergo a reversible shape change but are limited to two distinct shapes or require application of an external load. Aspects of the disclosure use a bonding technique or a cladding technique in conjunction with multiple shape memory materials to form a multiple shape memory material composite which is reversible.

A composite structure can undergo from n+1 to $2^n$ shape memory transitions, where n is the number of different shape memory materials in the composite structure. The shape memory materials can include reversible polymers, elastomers, or metal alloys. The composites can be constructed by layering, co-injection molding, joining material edges, welding, etc. Additionally, the composite can be constructed by utilizing shape memory material fibers and incorporating them into a base matrix such as epoxy resin. The shape memory materials may be clad together or bonded to a surface of a flexible substrate.

Shape memory materials are active, stimuli-responsive materials that can have multiple shape positions. They are materials that have the ability to transition from an initial shape to a transitioned shape when an external stimulus (e.g., heating/cooling) is provided/applied. Shape memory materials can exhibit reversible shape changes (e.g., induced by cooling and heating) which may thereby realize a two-way effect. They can be useful in biomedical devices, aerospace applications, self-healing surfaces, fasteners, wiring in specified arrangements, adhesives, etc. Shape memory materials may include an ability to be activated remotely to avoid damage to the surrounding environment during actuation and deployment. Typically, shape memory materials are metallic alloys or polymers, although other materials may also exhibit such properties.

Shape memory alloys can undergo a phase change between two phases that have different mechanical properties. The two phases are commonly referred to as the martensitic and austenitic phases based on the Martensite and Austenite phases of Nitinol, which is a widely used shape memory alloy. Nitinol is an alloy of nickel and titanium that has the ability to change shapes when heated, thereby having shape memory characteristics in addition to ductility, strength, corrosion resistance, electrical resistivity, and temperature stability. The martensitic state may be ductile and deformable while the austenitic state can be rigid with a higher elastic modulus. A characteristic of shape memory alloys is the transformation temperature at which phase transition of the shape memory alloy from martensitic phase to austenitic phase occurs.

If the shape memory alloy is heated above the transformation temperature, it converts to the austenitic phase, where it can be programmed or trained into a transitioned shape. After the transitioned shape is programmed, the shape memory alloy may be cooled back into the martensitic phase, where it can be deformed as a ductile material. If the shape memory alloy is subsequently heated above the transformation temperature, it will convert back to the austenitic phase and revert to the initial shape. Metallic alloys with shape memory properties can show a two-way shape memory effect after a thermal training. Accordingly, the material can remember the external shape in both the initial state and the transitioned state. As such, it is possible to produce a defined structure at a defined temperature that has been programmed before.

Shape memory polymers may be copolymers that are specially synthesized for application as shape memory materials. Potential applications for shape-memory polymers exist in various fields including automotive repairs, cooking devices, switches, sensors, tools, storage, etc. Production costs may be significant in order to manufacture polymers for shape memory applications. The shape memory effect can result from a combination of the polymer structure and the polymer morphology together with the applied processing and programming technology. Shape memory behavior can be observed for several polymers that may differ significantly in their chemical composition.

Aspects of the disclosure include shape memory materials that may be selected from a group consisting of at least one of: a set of metal alloys (e.g., biocompatible nitinol for a medical/surgical device, iron-based alloys for temperature/thermal shape memory applications), a set of polymers (e.g., polyurethanes, polyurethanes having ionic/mesogenic components, block copolymers including polyethyleneterephthalate/polyethyleneoxide/polystyrene), or a set of elastomers (e.g., linear/branched elastomers, polyurethane elastomers, thermoplastic elastomers). The first shape memory material has a first transition trigger to transition (e.g., transform, convert, evolve, shift) the first shape memory material between a first initial state (e.g., state/position X) and a first transitioned state (e.g., state/position Y). The first transitioned state is shaped different from the first initial state (e.g., shape P versus shape Q). Example two-dimensional shapes include lines, polygons, planes, or conic sections. Example three-dimensional shapes include polyhedra, ellipsoids, cylinders, or cones.

A transition trigger (e.g., activation, prompt, provocation, cause) can include a selection from a group consisting of at least one of: a set of temperatures (e.g., a heat source, a range of thermal values, a melting point, 10 degrees), a set of electric currents, a set of magnetic fields (e.g., using a ferromagnetic shape memory material configured to change in the presence of a magnetic field, using magneto-responsive fillers), a set of light stimuli (e.g., irradiation using an ultraviolet lamp, based on wavelength), or a set of chemical stimuli (e.g., dampness/aeration, water, alcohol, a measure of acidity). The first transition trigger includes a first threshold value (e.g., a numerical amount/measure) which indicates: the first transitioned state when exceeded, and the first initial state when not exceeded.

The second shape memory material has a second transition trigger to transition the second shape memory material between a second initial state and a second transitioned state. The second transitioned state is shaped different from the second initial state. The second shape memory material is different from the first shape memory material (e.g., at least with respect to the quantitative threshold or qualitative nature of the set of stimuli). As such, the second transition trigger is different from the first transition trigger (e.g., unique temperatures). The second transition trigger includes a second threshold value (e.g., 35 degrees) which both exceeds the first threshold value (e.g., 5 degrees) and indicates: the second transitioned state when exceeded (e.g., more than 35 degrees), and the second initial state when not exceeded (e.g., not more than 35 degrees).

FIGS. 1, 2, 3, and 4 relate to a structure having shape memory materials bonded to a surface of a flexible substrate. The flexible substrate can include a selection from a group consisting of at least one of: a polymeric material having a crystallinity value below a threshold crystallinity value, a steel alloy, a phosphor bronze alloy, an aluminum alloy, a titanium alloy, a titanium-nickel alloy, a carbon fiber-epoxy composite, a fiberglass-epoxy composite, a Kevlar-epoxy composite, a polyimide, a polyamide, a polyester, a polyvinylidene fluoride, a polypropylene, a polyethylene, or a polyurethane. Both the first and second shape memory materials may be bonded to the flexible substrate. The first and second shape memory materials are bonded to the flexible substrate using a selection from a group consisting of at least one of: an adhesive, an ultrasonic weld, or a lamination process. For example, pressure sensitive adhesives, two part thermosetting adhesives, hot melt adhesives, bonding films, hot roll lamination, vaccum lamination, etc.

FIG. 1 illustrates a first physical shape of the structure when the first shape memory material 111 has the first initial state and the second shape memory material 121 has the second initial state. The flexible substrate 105 may be bonded to the shape memory materials via bonds 108 and 109.

Figure 2:
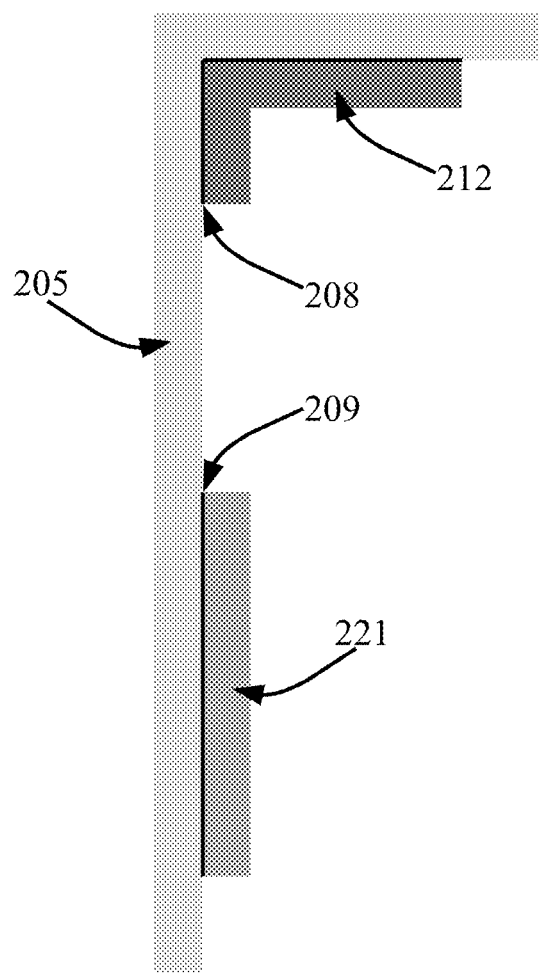
FIG. 2 illustrates a side viewpoint of a second physical shape of a structure having a bond to a flexible substrate, according to embodiments.

FIG. 2 illustrates a second physical shape of the structure when the first shape memory material 212 has the first transitioned state and the second shape memory material 221 has the second initial state. The flexible substrate 205 may be bonded to the shape memory materials via bonds 208 and 209.

Figure 3:
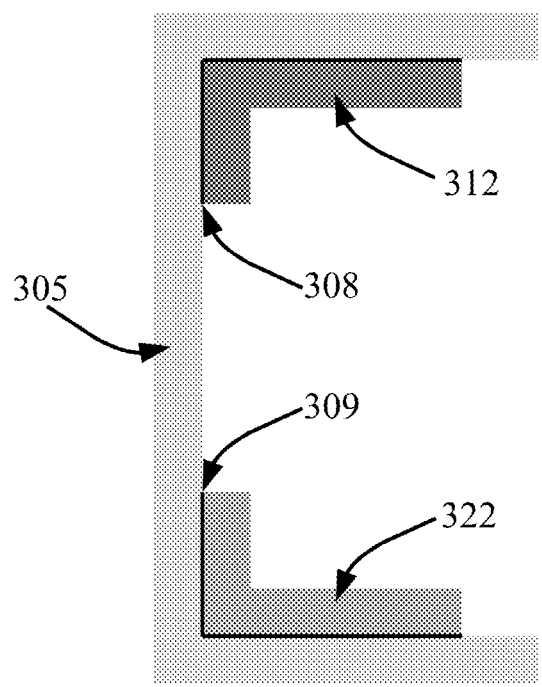
FIG. 3 illustrates a side viewpoint of a third physical shape of a structure having a bond to a flexible substrate, according to embodiments.

FIG. 3 illustrates a third physical shape of the structure when the first shape memory material 312 has the first transitioned state and the second shape memory material 322 has the second transitioned state. The flexible substrate 305 may be bonded to the shape memory materials via bonds 308 and 309.

In embodiments, the structure transforms such that the third physical shape is transitioned to in response to heating to the trigger temperature that transitions the second physical shape which, in turn, was transitioned to in response to heating to the trigger temperature of the first physical shape. Thereafter, with respect to the reversibility of embodiments, the first physical shape is transitioned to in response to cooling the second physical shape which, in turn, is transitioned to in response to cooling the third physical shape.

Figure 4:
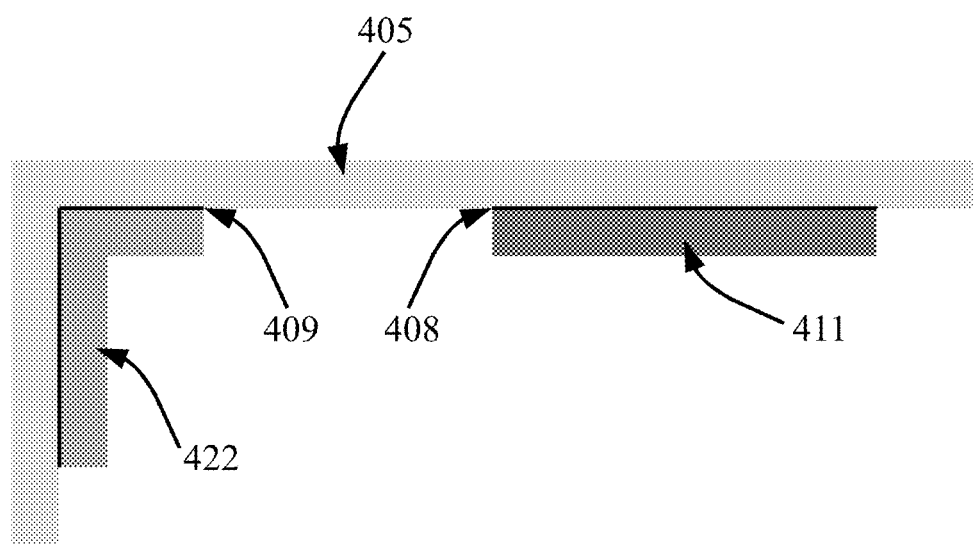
FIG. 4 illustrates a side viewpoint of a fourth physical shape of a structure having a bond to a flexible substrate, according to embodiments.

FIG. 4 illustrates a fourth physical shape (e.g., using two different types of transition triggers) of the structure when the first memory material 411 has the first initial state and the second memory material 422 has the second transitioned state. The flexible substrate 405 may be bonded to the shape memory materials via bonds 408 and 409.

FIGS. 5, 6, 7, and 8 relate to a structure having shape memory materials clad together. Various types of materials can be utilized for cladding depending upon the characteristics desired for the end product (e.g., biocompatibility). In embodiments, the cladding can have a hardness which is less than the hardness of a shape memory alloy which is being clad. For various usages, materials such as stainless steel, copper, gold, silver, nickel, or the like can be utilized for cladding. The first and second shape memory materials may be clad together using a selection from a group consisting of at least one of: a layered feature, an edge-joint, a weld, an adhesive, a lamination process, or a co-injection molding process. For example, pressure sensitive adhesives, two part thermosetting adhesives, hot melt adhesives, bonding films, hot roll lamination, vacuum lamination, etc.

Figure 5:
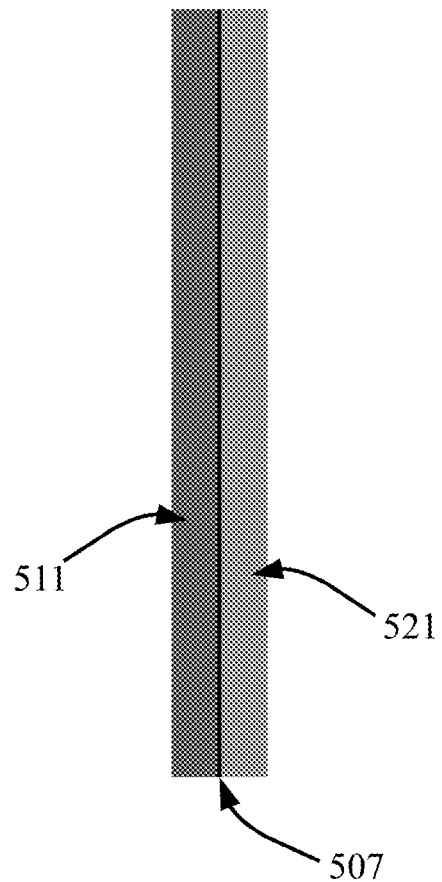
FIG. 5 illustrates a side viewpoint of a first physical shape of a structure having two shape memory materials clad together, according to embodiments.

FIG. 5 illustrates a first physical shape of the structure when the first shape memory material 511 has the first initial state and the second shape memory material 521 has the second initial state. The shape memory materials 511 and 521 may be coupled using a clad 507.

Figure 6:
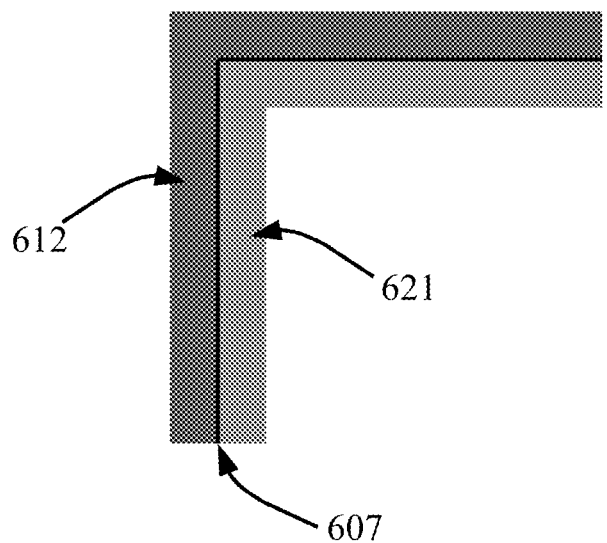
FIG. 6 illustrates a side viewpoint of a second physical shape of a structure having two shape memory materials clad together, according to embodiments.

FIG. 6 illustrates a second physical shape of the structure when the first shape memory material 612 has the first transitioned state and the second shape memory material 621 has the second initial state. The shape memory materials 612 and 621 may be coupled using a clad 607.

Figure 7:
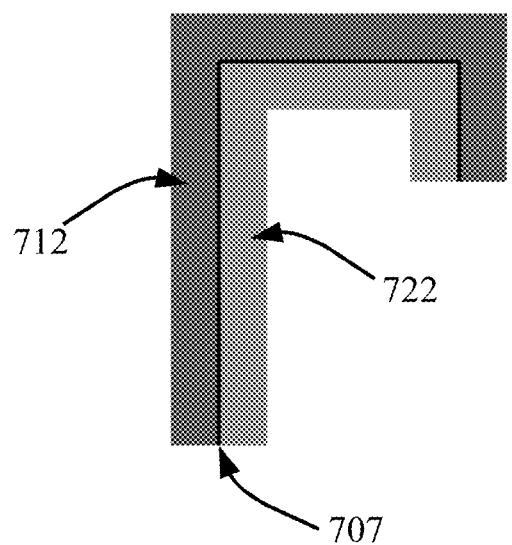
FIG. 7 illustrates a side viewpoint of a third physical shape of a structure having two shape memory materials clad together, according to embodiments.

FIG. 7 illustrates a third physical shape of the structure when the first shape memory material 712 has the first transitioned state and the second shape memory material 722 has the second transitioned state. The shape memory materials 712 and 722 may be coupled using a clad 707.

In embodiments, the structure transforms such that the third physical shape is transitioned to in response to heating to the trigger temperature that transitions the second physical shape which, in turn, was transitioned to in response to heating to the trigger temperature of the first physical shape. Thereafter, with respect to the reversibility of embodiments, the first physical shape is transitioned to in response to cooling the second physical shape which, in turn, is transitioned to in response to cooling the third physical shape.

Figure 8:
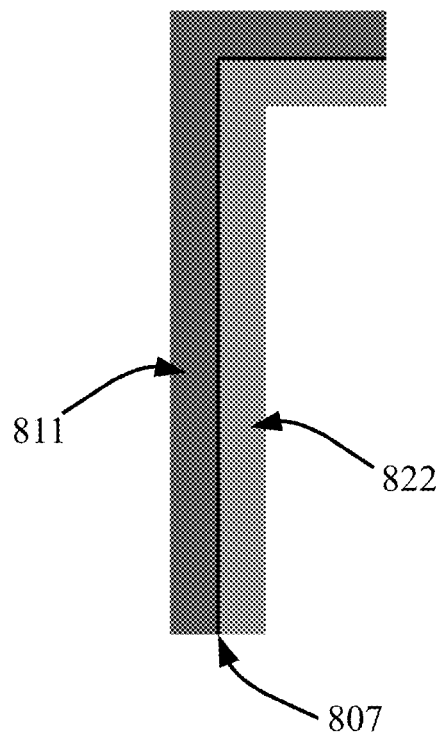
FIG. 8 illustrates a side viewpoint of a fourth physical shape of a structure having two shape memory materials clad together, according to embodiments.

FIG. 8 illustrates a fourth physical shape (e.g., using two different types of transition triggers) of the structure when the first memory material 811 has the first initial state and the second memory material 822 has the second transitioned state. The shape memory materials 811 and 822 may be coupled using a clad 807.

Figure 9:
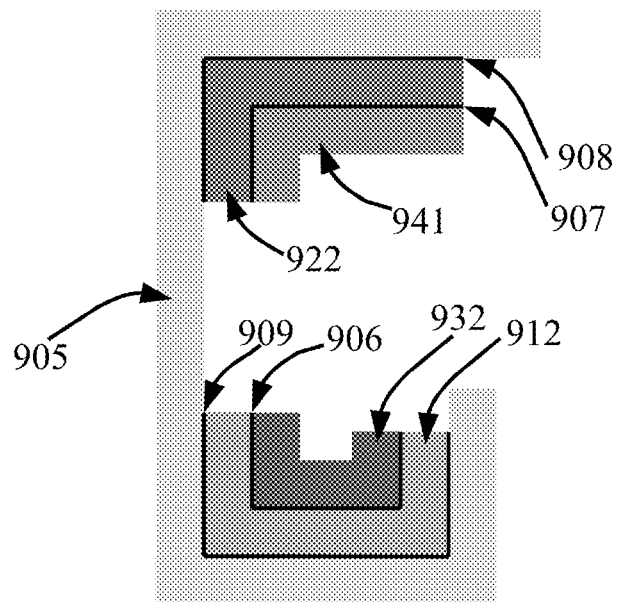
FIG. 9 illustrates a side viewpoint of a fourth physical shape of a structure having both bonds to a flexible substrate and shape memory materials clad together, according to embodiments.

FIG. 9 relates to a structure having both a first portion of shape memory materials bonded 908/909 to a surface of a flexible substrate 905 and a second portion of shape memory materials clad together 906/907 with the first portion of shape memory materials (e.g., a combination of aspects corresponding to FIGS. 1-8). FIG. 9 illustrates first 912, second 922, third 932, and fourth 941 shape memory materials. Each of the shape memory materials are different, as described herein (e.g., may be similarly composed but with different temperatures which trigger a transition, may be materials with unique compositions). Each of the shape memory materials have first, second, third, and fourth transition triggers. Each of the transition triggers are each different, as described herein (e.g., same type of stimuli with unique values, a combination of separate types of stimuli).

A first shape memory material has a first transition trigger to transition the first shape memory material between a first initial state and a first transitioned state. The first transitioned state is shaped different from the first initial state and the first shape memory material is bonded to the flexible substrate. A second shape memory material has a second transition trigger to transition the second shape memory material between a second initial state and a second transitioned state. The second transitioned state is shaped different from the second initial state and the second shape memory material is bonded to the flexible substrate.

A third shape memory material has a third transition trigger to transition the third shape memory material between a third initial state and a third transition state. The third transition state is shaped different from the third initial state and the first and third shape memory materials are clad together. A fourth shape memory material has a fourth transition trigger to transition the fourth shape memory material between a fourth initial state and a fourth transitioned state. The fourth transitioned state is shaped different from the fourth initial state and the second and fourth shape memory materials are clad together.

Depicted is a fourth physical shape of the structure when the first shape memory material 912 has the first transitioned state, the second shape memory material 922 has the second transitioned state, the third shape memory material 932 has the third transitioned state, and the fourth shape memory material 941 has the fourth initial state. As described herein, how the first, second, third, fifth, etc. physical shapes of the structure would be depicted may be understood by a person of ordinary skill in the art.

Figure 10:
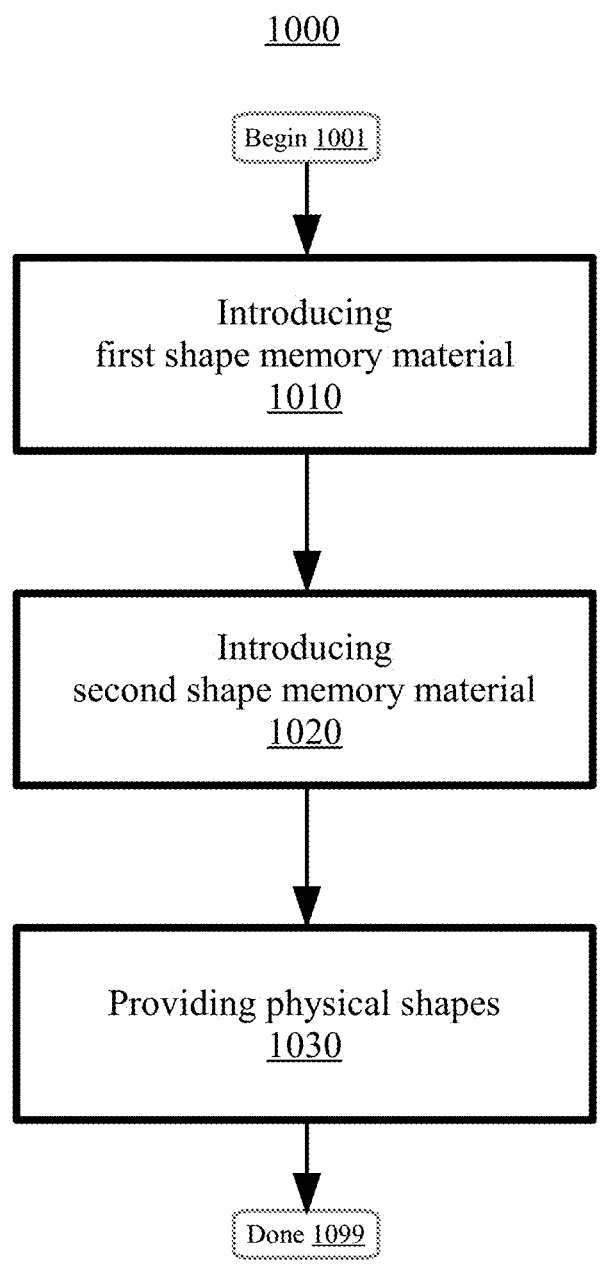
FIG. 10 is a flowchart illustrating a method for manufacturing a structure, according to embodiments.

FIG. 10 is a flowchart illustrating a method 1000 for manufacturing/constructing a structure, according to embodiments. The method may begin at block 1001. At block 1010, the first shape memory material may be introduced. At block 1020, the second shape memory material may be introduced. In embodiments, the first and second shape memory materials may be bonded to a flexible substrate (e.g., using a bonding technique described herein). In various embodiments, the first and second shape memory material may be clad together (e.g., using a cladding technique described herein). At block 1030, the physical shapes described herein are provided for (e.g., produced, rendered). The method may conclude at block 1099. Aspects of the disclosure may have performance or efficiency benefits (e.g., three or more physical shapes, reversible transitions, bonding/cladding).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Therefore, while the foregoing is directed to exemplary embodiments, other and further embodiments of the invention may be devised without departing from the basic scope thereof, and the scope thereof is determined by the claims that follow.

What is claimed is:

1. A structure, comprising:
a composite structure that forms $2^n$ predefined shapes at defined stimulus values, where n is a number of different shape memory materials, the composite structure comprising:
a flexible substrate, wherein the flexible substrate has a first surface and a second surface;
a first reversible shape memory material from the different shape memory materials, wherein the first reversible shape memory material is bonded to the flexible substrate; and
at least one additional reversible shape memory material from the different shape memory materials, wherein the at least one additional reversible shape memory material is different from the first shape memory material;
wherein the first reversible shape memory material and the at least one additional reversible shape memory material are bonded directly to the first surface of the flexible substrate.

2. The structure of claim 1, wherein a third physical shape of the $2^n$ predefined shapes is transitioned to in response to heating to a defined temperature that transitions a second physical shape of the $2^n$ predefined shapes which, in turn, was transitioned to in response to heating to a defined temperature of a first physical shape of the $2^n$ predefined shapes.

3. The structure of claim 2, wherein the first physical shape is transitioned to in response to cooling the second physical shape which, in turn, is transitioned to in response to cooling the third physical shape.

4. The structure of claim 1, further comprising a first transition trigger to transition the first reversible shape memory material between a first initial state and a first transitioned state, wherein the first transition trigger includes a first threshold stimulus value which indicates the first transitioned state when exceeded, and the first initial state when not exceeded.

5. The structure of claim 4, further comprising at least one additional transition trigger to transition the at least one additional reversible shape memory material between a next initial state and a next transitioned state, wherein the at least one additional transition trigger includes a next threshold stimulus value which both exceeds the first threshold value and indicates the next transitioned state when exceeded, and the next initial state when not exceeded.

6. The structure of claim 1, further comprising at least one transition trigger selected from a group consisting of at least one of:
a set of temperatures, a set of electric currents, a set of magnetic fields, a set of light stimuli, or a set of chemical stimuli.

7. The structure of claim 1, wherein the first reversible shape memory material and the at least one additional reversible shape memory material include a selection from a group consisting of at least one of:
a set of metal alloys, a set of polymers, or a set of elastomers.

8. The structure of claim 1, wherein the first reversible shape memory material and the at least one additional reversible shape memory material are bonded to the flexible substrate using a selection from a group consisting of at least one of:
an adhesive, an ultrasonic weld, or a lamination process.

9. The structure of claim 1, wherein:
the flexible substrate is a fiber-epoxy composite;
at least one of the defined stimulus values is a measure of acidity; and
at least one of the defined stimulus values is a measure of temperature.

10. The structure of claim 1, wherein the first reversible shape memory material and the one additional reversible shape memory material are bonded at separated locations along the first surface of the flexible substrate.

11. The structure of claim 10, further comprising a third reversible shape memory material, wherein the third reversible shape memory material is bonded to the first reversible shape memory material.

12. The structure of claim 9, wherein the fiber-epoxy composite is selected from a group consisting of:
a carbon fiber-epoxy composite, a fiberglass-epoxy composite, and a Kevlar-epoxy composite.

13. A structure, comprising:
a composite structure that forms at least $2^n$ predefined shapes at defined stimulus values, where at least one of the defined stimulus values is a measure of acidity, and where n is a number of different shape memory materials, the composite structure comprising:
a flexible substrate, wherein the flexible substrate is a fiber-epoxy composite, wherein the flexible substrate has a first surface and a second surface;
a first shape memory material having a first transition trigger to transition the first shape memory material between a first initial state and a first transitioned state, wherein the first transitioned state is shaped different from the first initial state, and wherein the first shape memory material is bonded to the flexible substrate;
a second shape memory material having a second transition trigger to transition the second shape memory material between a second initial state and a second transitioned state, wherein the second transitioned state is shaped different from the second initial state, and wherein the second shape memory material is bonded to the flexible substrate;
a third shape memory material having a third transition trigger to transition the third shape memory material between a third initial state and a third transition state, wherein the third transition state is shaped different from the third initial state, and wherein the first and third shape memory materials are clad together;
a fourth shape memory material having a fourth transition trigger to transition the fourth shape memory material between a fourth initial state and a fourth transitioned state, wherein the fourth transitioned state is shaped different from the fourth initial state, and wherein the second and fourth shape memory materials are clad together; and
wherein each of the first, second, third, and fourth shape memory materials are different, wherein each of the first, second, third, and fourth transition triggers are different defined stimulus values,
wherein the first shape memory material and the second shape memory material are bonded directly to the first surface of the flexible substrate,
a first physical shape of the at least 2" predefined shapes when the first shape memory material has the first initial state, the second shape memory material has the second initial state, the third shape memory material has the third initial state, and the fourth shape memory material has the fourth initial state,
a second physical shape of the at least 2" predefined shapes when the first shape memory material has the first transitioned state, the second shape memory material has the second initial state, the third shape memory material has the third initial state, and the fourth shape memory material has the fourth initial state,
a third physical shape of the at least 2" predefined shapes when the first shape memory material has the first transitioned state, the second shape memory material has the second transitioned state, the third shape memory material has the third initial state, and the fourth shape memory material has the fourth initial state,
a fourth physical shape of the at least 2" predefined shapes when the first shape memory material has the first transitioned state, the second shape memory material has the second transitioned state, the third shape memory material has the third transitioned state, and the fourth shape memory material has the fourth initial state, and
a fifth physical shape of the at least 2" predefined shapes when the first shape memory material has the first transitioned state, the second shape memory material has the second transitioned state, the third shape memory material has the third transitioned state, and the fourth shape memory material has the fourth transitioned state.

* * * * *